(12) United States Patent
Zhang et al.

(10) Patent No.: US 12,130,646 B2
(45) Date of Patent: Oct. 29, 2024

(54) REAL-TIME TEMPERATURE-PRESSURE DETECTION AND RAPID PROCESSING SYSTEM FOR CALIBRATION PLATFORM

(71) Applicant: SICHUAN UNIVERSITY, Chengdu (CN)

(72) Inventors: Zetian Zhang, Chengdu (CN); Heping Xie, Chengdu (CN); Ru Zhang, Chengdu (CN); Yihang Li, Chengdu (CN); Jianan Li, Chengdu (CN); Ling Chen, Chengdu (CN); Mingzhong Gao, Chengdu (CN); Wei Huang, Chengdu (CN); Li Ren, Chengdu (CN); Chendi Lou, Chengdu (CN); Kun Xiao, Chengdu (CN); Weiqiang Ling, Chengdu (CN); Zhilong Zhang, Chengdu (CN)

(73) Assignee: SICHUAN UNIVERSITY, Chengdu (CN)

( * ) Notice: Subject to any disclaimer, the term of this patent is extended or adjusted under 35 U.S.C. 154(b) by 0 days.

(21) Appl. No.: 18/034,401

(22) PCT Filed: Dec. 22, 2022

(86) PCT No.: PCT/CN2022/141067
§ 371 (c)(1),
(2) Date: Apr. 28, 2023

(87) PCT Pub. No.: WO2023/240983
PCT Pub. Date: Dec. 21, 2023

(65) Prior Publication Data
US 2024/0264617 A1    Aug. 8, 2024

(30) Foreign Application Priority Data
Jun. 15, 2022   (CN) .......................... 202210675076.9

(51) Int. Cl.
G05D 27/02 (2006.01)
G05D 16/20 (2006.01)

(52) U.S. Cl.
CPC ......... *G05D 27/02* (2013.01); *G05D 16/2066* (2013.01)

(58) Field of Classification Search
None
See application file for complete search history.

(56) References Cited

U.S. PATENT DOCUMENTS 8,670,866 B2 *   3/2014   Ziegler ................. A47L 11/302
                                                      318/609
2017/0160774 A1   6/2017   Han

FOREIGN PATENT DOCUMENTS

| CN | 112835400 A | 5/2021 |
|---|---|---|
| CN | 112859946 A | 5/2021 |

(Continued)

*Primary Examiner* — Mohammad Ali
*Assistant Examiner* — Saad M Kabir
(74) *Attorney, Agent, or Firm* — Bayramoglu Law Offices LLC

(57) ABSTRACT

A real-time temperature-pressure detection and rapid processing system for a calibration platform, comprises an inner return pipe, and a water supply pipe is provided therein with an inner water supply pipe. An outer wall of the inner water supply pipe is connected with an inner wall of the water supply pipe through multiple springs. An outer wall of the inner return pipe is connected with an inner wall of a return pipe through multiple springs. The return pipe and the water supply pipe are made of a thermosetting polymer material. The multiple springs, the inner water supply pipe, and the inner return pipe are covered with a heat conducting material. The system further includes a temperature-pressure detection assembly. The assembly includes multiple infrared sensors arranged at two sides of the return pipe and the water (Continued)

supply pipe, a booster pump, a heater, and infrared sensors connected with a control unit.

8 Claims, 4 Drawing Sheets

(56) References Cited

FOREIGN PATENT DOCUMENTS

| | | | |
|---|---|---|---|
| CN | 112901573 | A | 6/2021 |
| CN | 115167576 | A | 10/2022 |

* cited by examiner

REAL-TIME TEMPERATURE-PRESSURE DETECTION AND RAPID PROCESSING SYSTEM FOR CALIBRATION PLATFORM

CROSS-REFERENCES OF THE RELATED APPLICATIONS

The application is a national stage entry of PCT/CN2022/141067 filed on Dec. 22, 2022, which claims priority to Chinese patent applications No. 202210091903.X filed on Jun. 15, 2022, the entire contents of which are incorporated herein by reference.

TECHNICAL FIELD

The present disclosure relates to the technical field of safety detection, and in particular to a real-time temperature-pressure detection and rapid processing system for a calibration platform.

BACKGROUND

With the gradual depletion of shallow resources, it has become an inevitable trend for human development to explore deep resources and space. However, the deep underground environment is complex and subject to frequent and unpredictable geological disasters. In addition, there is a lack of revolutionary theories and technologies applicable to deep energy and underground engineering that work with the complex environment of the deep underground. The development and space utilization of deep resources are difficult and safety cannot be guaranteed. Therefore, it is important to test and analyze the physical and mechanical behaviors of rocks in the deep in-situ environment and to investigate the different laws of the physical and mechanical behaviors of rocks in the in-situ environment at different depths.

The development and spatial utilization of deep resources are faced with high stress, high temperature, and high seepage pressure, which are different from those in the shallow resource environment. In the deep resource environment, the maximum temperature can reach more than 100° C. and the maximum seepage pressure can reach more than 100 MPa. In view of this, the present disclosure designs and develops a calibration platform for a deep in-situ coring simulation test by providing high-fidelity seepage pressure, composition, humidity, temperature, and luminous flux of the deep underground environment. The calibration platform can simulate the deep in-situ environment of high stress, high temperature, and high seepage pressure. In the process of in-situ high-fidelity coring simulation test of deep rocks, each pipeline of the equipment and the interior of the simulation chamber are in a high-temperature and high-pressure environment. In order to ensure the long-term operation of the deep in-situ high-fidelity coring simulation test platform and the stability of the internal high-temperature and high-pressure environment, safety protection measures and real-time monitoring management are essential. At present, the temperature-pressure monitoring system and safety control system of large equipment under high temperature and high pressure cannot fully meet the use of the deep in-situ high-fidelity coring simulation test platform.

SUMMARY

An objective of the present disclosure is to provide a real-time temperature-pressure detection and rapid processing system for a calibration platform, so as to solve the technical problem that the existing calibration platform is unstable in a high-temperature and high-pressure environment.

The present disclosure is implemented as follows:

The present disclosure provides a real-time temperature-pressure detection and rapid processing system for a calibration platform. The calibration platform includes a simulation chamber and a water supply tank; the water supply tank is communicated with the simulation chamber through a water supply pipe; the water supply pipe is provided with a booster pump and a heater; a return pipe is further provided between the water supply tank and the simulation chamber, and the water supply tank and the simulation chamber are further communicated through the return pipe; the return pipe is provided therein with an inner return pipe, and the water supply pipe is provided therein with an inner water supply pipe; an outer wall of the inner water supply pipe is connected with an inner wall of the water supply pipe through multiple springs; an outer wall of the inner return pipe is connected with an inner wall of the return pipe through multiple springs; the return pipe and the water supply pipe are made of a thermosetting polymer material; the multiple springs, the inner water supply pipe, and the inner return pipe are covered with a heat conducting material; the real-time temperature-pressure detection and rapid processing system further includes a temperature-pressure detection assembly; the temperature-pressure detection assembly includes multiple infrared sensors; the multiple infrared sensors are respectively arranged at two sides of the return pipe and the water supply pipe; the booster pump, the heater, and any one of the infrared sensors are connected with a control unit; the real-time temperature-pressure detection and rapid processing system further includes a temperature-pressure processing assembly; the temperature-pressure processing assembly includes a heat exchange pipe; two ends of the heat exchange pipe are respectively communicated with a top of the simulation chamber and a top of the water supply tank; the heat exchange pipe is provided therein with an outlet fan and an inlet fan; the inlet fan is provided opposite to the outlet fan; the inlet fan and the outlet fan are connected with the control unit; the heat exchange pipe is further provided with an exhaust port; the exhaust port is provided with an exhaust valve; the exhaust valve is threaded with the exhaust port; the exhaust valve is connected with a shaft of the outlet fan and a shaft of the inlet fan through a transmission mechanism; the exhaust valve is provided with a limit part matching a switch of the transmission mechanism; the temperature-pressure processing assembly further includes a drainage pipe; a bottom of the simulation chamber and a bottom of the water supply tank are communicated through the drainage pipe; the drainage pipe is provided therein with a flow valve, a liquid extraction pump, and solenoid valves; an air duct is further provided between the drainage pipe and the heat exchange pipe; the solenoid valves are respectively provided between the heat exchange pipe and the simulation chamber and between the drainage pipe and the simulation chamber; and the solenoid valves are connected with the control unit.

Further, the real-time temperature-pressure detection and rapid processing system for a calibration platform includes a strength detector; and the strength detector is configured to detect deformation (tensile) strengths of the return pipe and the water supply pipe and is connected with the control unit.

Further, the springs are naturally stretched at room temperature and atmospheric pressure.

Further, the thermosetting polymer material includes phenolic, aldehyde, melamine formaldehyde, epoxy, unsaturated polyester or organic silicon.

Further, the heat conducting material includes heat conducting graphene, heat conducting silicone grease, heat conducting resin or heat conducting gel.

Further, the simulation chamber is provided therein with a pressure sensor and a temperature sensor; and the pressure sensor and the temperature sensor are connected with the control unit.

Further, the inner return pipe and the inner water supply pipe each are provided with a one-way valve.

Further, the transmission mechanism includes a first transmission shaft, a second transmission shaft, and a drive motor; the drive motor is connected with the control unit; the drive motor includes a first output end connected with the first transmission shaft and a second output end connected with the second transmission shaft; the first transmission shaft is provided with a first pressure sensor, and the second transmission shaft is provided with a second pressure sensor; the first pressure sensor and the second pressure sensor are connected with the control unit; and the first transmission shaft is connected with a rotating shaft of the outlet fan, and the second transmission shaft is connected with a rotating shaft of the inlet fan.

Compared with the prior art, the present disclosure has at least the following advantages:

The present disclosure provides a real-time temperature-pressure detection and rapid processing system for a calibration platform. The system detects a small deformation of the return pipe and the water supply pipe by the infrared light to determine and transmit the current temperature to the control unit. The control unit controls the start and stop of the booster pump and the heater. When the temperature is too high, the volume of the return pipe and the water supply pipe increases due to the thermal expansion and contraction and the pressure of the springs. In this way, the infrared light is blocked and transmitted to the control unit. The control unit calculates the current temperature according to the material type and deformation degree. When the current temperature exceeds the safe value, the control unit controls the heater and the booster pump to stop, thus ensuring the safe operation of the calibration platform.

BRIEF DESCRIPTION OF THE DRAWINGS

To describe the technical solutions in the embodiments of the present disclosure more clearly, the drawings required for describing the embodiments are briefly described below. It should be understood that the following drawings show merely some embodiments of the present disclosure, and thus should not be regarded as a limitation to the scope. A person of ordinary skill in the art may still derive other related drawings from these drawings without creative efforts.

Figure 1:
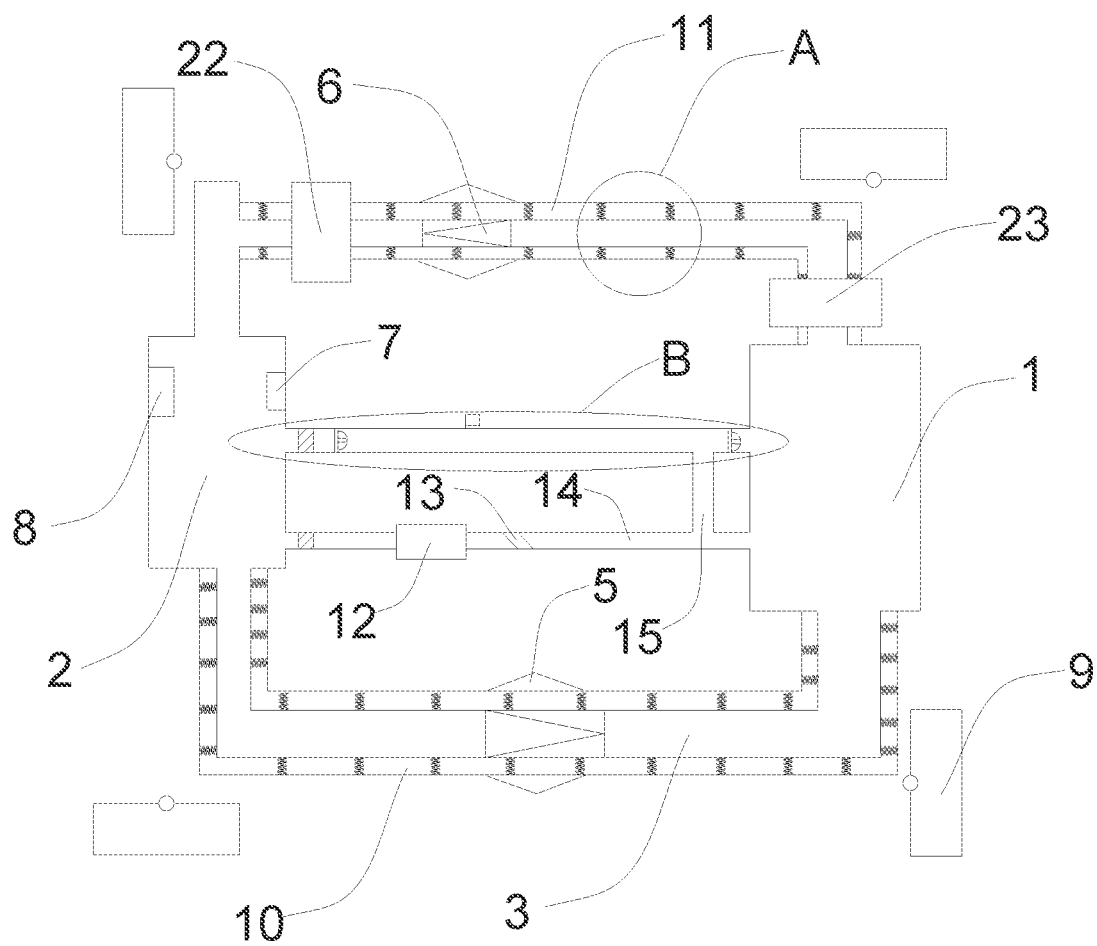
FIG. 1 is a structural diagram of a real-time temperature-pressure detection and rapid processing system for a calibration platform according to an embodiment of the present disclosure.

Reference Numerals: 1. water supply tank; 2. simulation chamber; 3. inner return pipe; 4. inner water supply pipe; 5. strength detector; 6. one-way valve; 7. temperature sensor; 8. pressure sensor; 9. infrared sensor; 10. return pipe; 11. water supply pipe; 12. spring; 13. flow valve; 14. drainage pipe; 15. air duct; 16. solenoid valve; 17. outlet fan; 18. heat exchange pipe; 19. exhaust port; 20. exhaust valve; 21. inlet fan; 22. heater; 23. booster pump; 24. drive motor; 25. second transmission shaft; 26. first transmission shaft; 27. first pressure sensor; and 28. second pressure sensor.

DETAILED DESCRIPTION OF THE EMBODIMENTS

In order to make the objectives, technical solutions and advantages of the embodiments of the present disclosure clearer, the technical solutions in the embodiments of the present disclosure will be clearly and completely described below in conjunction with the drawings in the embodiments of the present disclosure. Obviously, the described embodiments are some, rather than all of the embodiments of the present disclosure. Generally, components of the embodiments of the present disclosure described and shown in the drawings may be arranged and designed in various manners.

Therefore, the following detailed description of the embodiments of the present disclosure in the drawings is not intended to limit the protection scope of the present disclosure, but merely represent selected embodiments of the present disclosure. All other embodiments obtained by those of ordinary skill in the art based on the embodiments of the present disclosure without creative efforts should fall within the protection scope of the present disclosure.

It should be noted that similar reference signs and letters represent similar items in the drawings below. Therefore, once an item is defined in one drawing, it does not need to be further defined and described in subsequent drawings.

In the description of the present disclosure, it should be noted that orientations or position relationships indicated by terms "center", "upper", "lower", "left", "right", "vertical", "horizontal", "inner", "outer", etc. are orientation or position relationships shown in the drawings, and these terms are only used to facilitate description of the present disclosure and simplify the description, but not to indicate or imply that the mentioned apparatus or components must have a specific orientation or must be established and operated in a specific orientation, and thus these terms cannot be understood as a limitation to the present disclosure. In addition, the terms such as "first", "second", and "third" are used only for the purpose of description and cannot be understood to indicate or imply relative importance.

Moreover, terms such as "horizontal", "vertical", and "overhanging" do not mean that a component is absolutely horizontal or overhanging, but that it can be tilted slightly. If "horizontal" only means that a direction of the component is more horizontal than "vertical", it does not mean that the structure must be completely horizontal, but can be tilted slightly.

In the description of the embodiment of the present disclosure, the term "multiple", if any, means at least two.

In the description of the present disclosure, it should be noted that, unless otherwise clearly specified and limited, meanings of terms "install", "connected with", and "connected to" should be understood in a board sense. For embodiment, the connection may be a fixed connection, a removable connection, or an integral connection; may be a mechanical connection or an electrical connection; may be a direct connection or an indirect connection by using an intermediate medium; or may be intercommunication between two components. Those of ordinary skill in the art may understand specific meanings of the above terms in the present disclosure based on a specific situation.

EMBODIMENT

Figure 2:
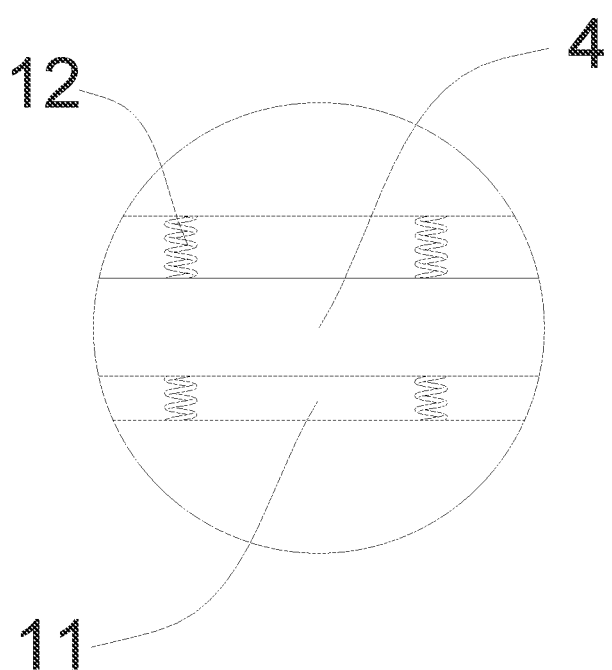
FIG. 2 is a detail view of A shown in FIG. 1 of the real-time temperature-pressure detection and rapid processing system for a calibration platform according to an embodiment of the present disclosure.
Figure 3:
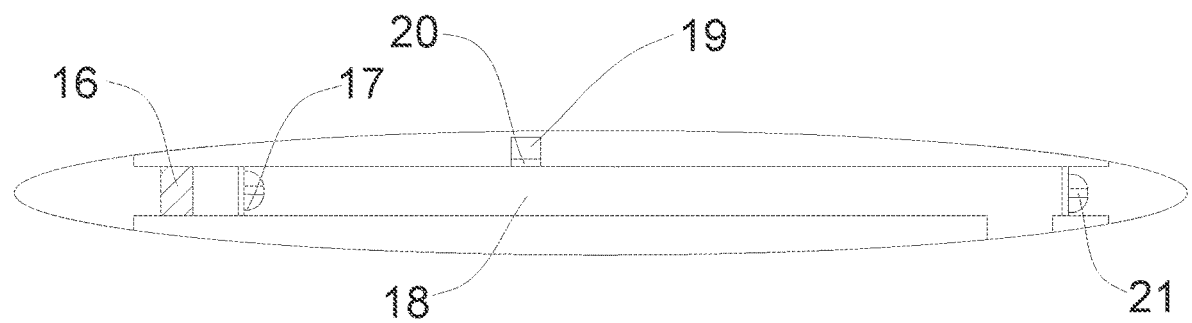
FIG. 3 is a detail view of B shown in FIG. 1 of the real-time temperature-pressure detection and rapid processing system for a calibration platform according to an embodiment of the present disclosure.
Figure 4:
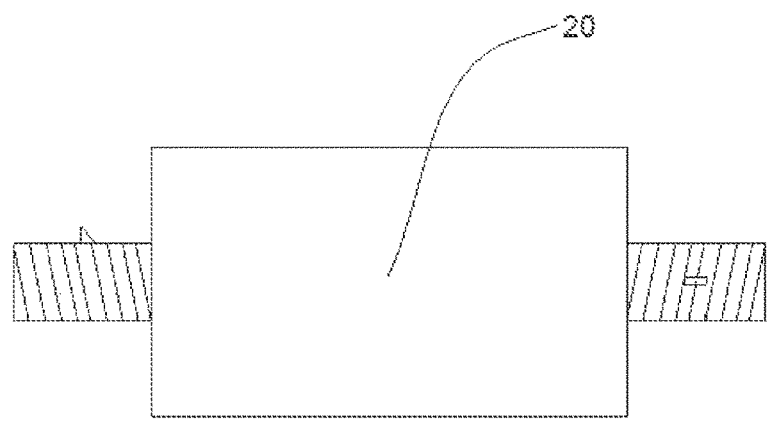
FIG. 4 is a structural diagram of an exhaust valve of the real-time temperature-pressure detection and rapid processing system for a calibration platform according to an embodiment of the present disclosure.
Figure 5:
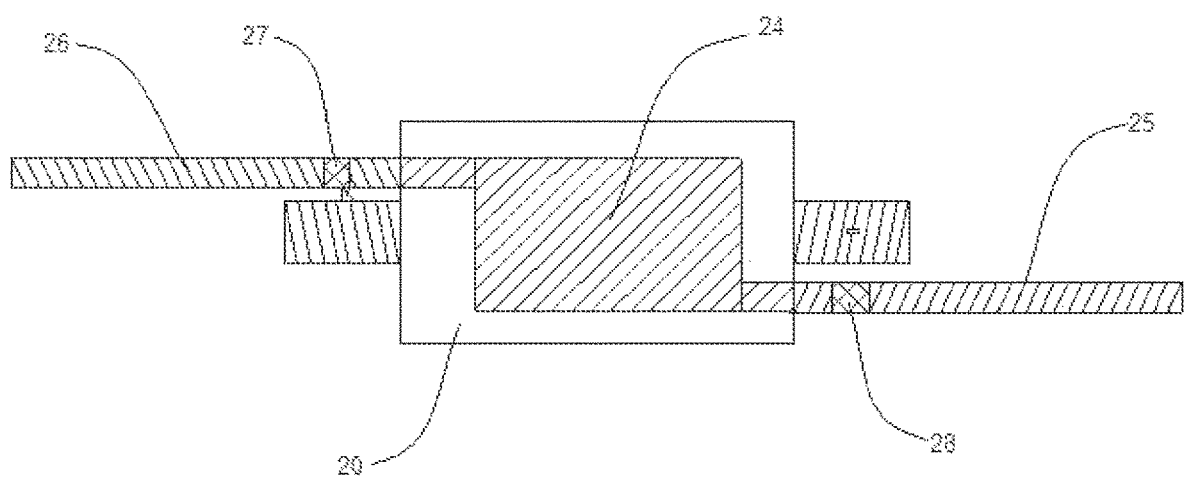
FIG. 5 is a structural diagram of the exhaust valve and a transmission mechanism of the real-time temperature-pressure detection and rapid processing system for a calibration platform according to an embodiment of the present disclosure.

Referring to FIGS. 1 to 5, FIG. 1 is a structural diagram of a real-time temperature-pressure detection and rapid processing system for a calibration platform according to an embodiment of the present disclosure; FIG. 2 is a detail view of A shown in FIG. 1 of the real-time temperature-pressure detection and rapid processing system for a calibration platform according to an embodiment of the present disclosure; FIG. 3 is a detail view of B shown in FIG. 1 of the real-time temperature-pressure detection and rapid processing system for a calibration platform according to an embodiment of the present disclosure; FIG. 4 is a structural diagram of exhaust valve 20 of the real-time temperature-pressure detection and rapid processing system for a calibration platform according to an embodiment of the present disclosure; and FIG. 5 is a structural diagram of the exhaust valve 20 and a transmission mechanism of the real-time temperature-pressure detection and rapid processing system for a calibration platform according to an embodiment of the present disclosure.

This embodiment provides a real-time temperature-pressure detection and rapid processing system for a calibration platform. The calibration platform includes simulation chamber 2 and water supply tank 1. The water supply tank 1 is communicated with the simulation chamber 2 through water supply pipe 11. The water supply pipe 11 is provided with booster pump 23 and heater 22. Return pipe 10 is further provided between the water supply tank 1 and the simulation chamber 2, and the water supply tank 1 and the simulation chamber 2 are further communicated through the return pipe 10. The return pipe 10 is provided therein with inner return pipe 3, and the water supply pipe 11 is provided therein with inner water supply pipe 4. An outer wall of the inner water supply pipe 4 is connected with an inner wall of the water supply pipe 11 through multiple springs 12, and an outer wall of the inner return pipe 3 is connected with an inner wall of the return pipe 10 through multiple springs 12. The return pipe 10 and the water supply pipe 11 are made of a thermosetting polymer material. The multiple springs 12, the inner water supply pipe 4, and the inner return pipe 3 are covered with a heat conducting material. The real-time temperature-pressure detection and rapid processing system further includes a temperature-pressure detection assembly. The temperature-pressure detection assembly includes multiple infrared sensors 9. The multiple infrared sensors 9 are respectively arranged at two sides of the return pipe 10 and the water supply pipe 11. The booster pump 23, the heater 22, and any one of the infrared sensors 9 are connected with a control unit. The real-time temperature-pressure detection and rapid processing system further includes a temperature-pressure processing assembly. The temperature-pressure processing assembly includes heat exchange pipe 18. Two ends of the heat exchange pipe 18 are respectively communicated with a top of the simulation chamber 2 and a top of the water supply tank 1. The heat exchange pipe 18 is provided therein with outlet fan 17 and inlet fan 21. The inlet fan 21 is provided opposite to the outlet fan 17. The inlet fan 21 and the outlet fan 17 are connected with the control unit. The heat exchange pipe 18 is further provided with exhaust port 19. The exhaust port 19 is provided with exhaust valve 20. The exhaust valve 20 is threaded with the exhaust port 19. The exhaust valve 20 is connected with a shaft of the outlet fan 17 and a shaft of the inlet fan 21 through a transmission mechanism. The exhaust valve 20 is provided with a limit part matching a switch of the transmission mechanism. The temperature-pressure processing assembly further includes drainage pipe 14. A bottom of the simulation chamber 2 and a bottom of the water supply tank 1 are communicated through the drainage pipe 14. The drainage pipe 14 is provided with flow valve 13, liquid extraction pump, and solenoid valves 16. Air duct 15 is further provided between the drainage pipe 14 and the heat exchange pipe 18. The solenoid valves 16 are respectively provided between the heat exchange pipe 18 and the simulation chamber 2 and between the drainage pipe 14 and the simulation chamber 2. The solenoid valves 16 are connected with the control unit. The system detects a small deformation of the return pipe 10 and the water supply pipe 11 through infrared light to determine and transmit a current temperature to the control unit. The control unit controls the start and stop of the booster pump 23 and the heater 22. When the temperature is too high, the volume of the return pipe 10 and the water supply pipe 11 increases due to the thermal expansion and contraction and the pressure of the springs 12. Thus, the infrared light is blocked and transmitted to the control unit. The control unit calculates the current temperature according to a material type and deformation degree. When the current temperature exceeds a safe value, the control unit controls the heater 22 and the booster pump 23 to stop, thus ensuring the safe operation of the calibration platform. The heat exchange pipe 18 can realize gas heat exchange, so as to avoid excessive temperature and pressure in the simulation chamber 2. When the temperature and pressure in the simulation chamber 2 are too high, temperature sensor 7 and pressure sensor transmit signals to the control unit. The control unit controls the solenoid valves 16 to open and drives the outlet fan 17 to rotate. The outlet fan 17 drives the transmission mechanism to rotate and drives the exhaust valve 20 to open. When the temperature and pressure in the simulation chamber 2 decrease, the control unit controls the outlet fan 17 to stop and the inlet fan 21 to rotate, thus reducing the temperature in the simulation chamber 2. Cold air flows into the air duct 15, and part of cold water in the water supply tank 1 flows into the simulation chamber 2 through the drainage pipe 14, the flow valve 13, and the liquid extraction pump to further cool down. When the temperature and pressure in the simulation chamber 2 return to normal, the temperature sensor 7 and the pressure sensor send signals to the control unit to close the solenoid valve 16.

In this embodiment, a rotation time of the outlet fan 17 is 30 seconds after the solenoid valve 16 is opened, and an air inlet time of the inlet fan 21 is about 30-60 seconds after the solenoid valve is opened.

The real-time temperature-pressure detection and rapid processing system for a calibration platform further includes strength detector 5. The strength detector 5 is configured to detect strengths of the return pipe 10 and the water supply pipe 11. The strength detector 5 is connected with the control unit. The strength detector 5 detect the strengths of the return pipe 10 and the water supply pipe 11 to avoid strength reduction of the return pipe 10 and the water supply pipe 11 due to the high temperature in the return pipe 10 and the water supply pipe 11.

The springs 12 are naturally stretched at room temperature and atmospheric pressure. Therefore, the springs 12 are stretched after being heated, thus generating a pressure on the water supply pipe 11 and the return pipe 10, causing the water supply pipe 11 and the return pipe 10 to deform outward.

The thermosetting polymer material includes phenolic, aldehyde, melamine formaldehyde, epoxy, unsaturated polyester or organic silicon. When the thermosetting polymer material deforms due to a temperature rise, it does not affect the performance of the return pipe 10 and the water supply pipe 11, thus avoiding the thermal decomposition of the return pipe 10 and the water supply pipe 11.

The heat conducting material includes heat conducting graphene, heat conducting silicone grease, heat conducting resin or heat conducting gel. The heat conducting material can transfer the temperature of water from the inner water supply pipe 4 or the inner return pipe 3 to the springs 12 and then to the return pipe 10 or the water supply pipe 11, causing the water supply pipe 11 or the return pipe 10 to deform.

The simulation chamber 2 is further provided with the pressure sensor 8 and the temperature sensor 7. The pressure sensor 8 and the temperature sensor 7 are connected with the control unit. The temperature sensor 7 and the pressure sensor 8 provided in the simulation chamber 2 respectively detect the temperature and pressure in the simulation chamber 2, and transmit signals to the control unit, such that the control unit controls the heater 22 and the booster pump 23 to stop or work.

The inner return pipe 3 and the inner water supply pipe 4 each are provided with one-way valve 6. The one-way valve 6 is configured to avoid liquid backflow in the inner water supply pipe 4 or the inner return pipe 3 when the pressure is too high.

The transmission mechanism includes a first transmission shaft, a second transmission shaft, and drive motor 24. The drive motor 24 is connected with the control unit. The drive motor 24 includes a first output end connected with the first transmission shaft and a second output end connected with the second transmission shaft. The first transmission shaft is provided with first pressure sensor 27, and second transmission shaft 25 is provided with second pressure sensor 28. The first pressure sensor 27 and the second pressure sensor 28 are connected with the control unit. The first transmission shaft is connected with a rotating shaft of the outlet fan 17, and the second transmission shaft is connected with a rotating shaft of the inlet fan 21. When the limit part is butted with the first pressure sensor 27 and the solenoid valve 16 is opened for less than 30 s, the first pressure sensor 27 sends a stop signal to the control unit. The control unit controls the drive motor 24 to stop the first transmission shaft 26, such that the exhaust valve 20 stops rotating and remains open. When the limit part is butted with the second pressure sensor 28 and the solenoid valve 16 is opened for more than 30 s for less than one minute, the exhaust valve 20 stops rotating and remains closed.

To sum up, the embodiment of the present disclosure provides a real-time temperature-pressure detection and rapid processing system for a calibration platform. The system detects a small deformation of the return pipe 10 and the water supply pipe 11 by the infrared light to determine and transmit the current temperature to the control unit. The control unit controls the start and stop of the booster pump 23 and the heater 22. When the temperature is too high, the volume of the return pipe 10 and the water supply pipe 11 increases due to the thermal expansion and contraction and the pressure of the springs 12. In this way, the infrared light is blocked and transmitted to the control unit. The control unit calculates the current temperature according to the material type and deformation degree. When the current temperature exceeds the safe value, the control unit controls the heater 22 and the booster pump 23 to stop, thus ensuring the safe operation of the calibration platform.

The above described are merely preferred embodiments of the present disclosure and are not intended to limit the present disclosure, and various changes and modifications may be made to the present disclosure by those skilled in the art. Any modifications, equivalent substitutions, improvements, etc. made within the spirit and scope of the present disclosure should be included within the protection scope of the present disclosure.

What is claimed is:

1. A real-time temperature-pressure detection and rapid processing system for a calibration platform, comprising:
    a simulation chamber and a water supply tank, wherein the water supply tank is communicated with the simulation chamber through a water supply pipe; the water supply pipe is provided with a booster pump and a heater; a return pipe is further provided between the water supply tank and the simulation chamber; the water supply tank and the simulation chamber are further communicated through the return pipe;
    the return pipe is provided therein with an inner return pipe, and the water supply pipe is provided therein with an inner water supply pipe; an outer wall of the inner water supply pipe is connected with an inner wall of the water supply pipe through multiple springs; an outer wall of the inner return pipe is connected with an inner wall of the return pipe through multiple springs; the return pipe and the water supply pipe are made of a thermosetting polymer material; and the multiple springs, the inner water supply pipe, and the inner return pipe are covered with a heat conducting material;
    the real-time temperature-pressure detection and rapid processing system further comprises a temperature-pressure detection assembly; wherein the temperature-pressure detection assembly comprises multiple infrared sensors; the multiple infrared sensors are respectively arranged at two sides of the return pipe and the water supply pipe; and the booster pump, the heater, and any one of the infrared sensors are connected with a control unit; and
    the real-time temperature-pressure detection and rapid processing system further comprises a temperature-pressure processing assembly; wherein the temperature-pressure processing assembly comprises a heat exchange pipe; two ends of the heat exchange pipe are respectively communicated with a top of the simulation chamber and a top of the water supply tank; the heat exchange pipe is provided therein with an outlet fan and an inlet fan; the inlet fan is provided opposite to the outlet fan; the inlet fan and the outlet fan are connected with the control unit;
    the heat exchange pipe is further provided with an exhaust port; the exhaust port is provided with an exhaust valve; the exhaust valve is threaded with the exhaust port; the exhaust valve is connected with a shaft of the outlet fan and a shaft of the inlet fan through a transmission mechanism; and the exhaust valve is provided with a limit part matching a switch of the transmission mechanism;

wherein the temperature-pressure processing assembly further comprises a drainage pipe; a bottom of the simulation chamber and a bottom of the water supply tank are communicated through the drainage pipe; the drainage pipe is provided therein with a flow valve, a liquid extraction pump, and solenoid valves; an air duct is further provided between the drainage pipe and the heat exchange pipe; the solenoid valves are respectively provided between the heat exchange pipe and the simulation chamber and between the drainage pipe and the simulation chamber; and the solenoid valves are connected with the control unit.

2. The real-time temperature-pressure detection and rapid processing system for the calibration platform according to claim 1, further comprising a strength detector, wherein the strength detector is configured to detect strengths of the return pipe and the water supply pipe and is connected with the control unit.

3. The real-time temperature-pressure detection and rapid processing system for the calibration platform according to claim 1, wherein the springs are naturally stretched at room temperature and atmospheric pressure.

4. The real-time temperature-pressure detection and rapid processing system for the calibration platform according to claim 1, wherein the thermosetting polymer material comprises phenolic, aldehyde, melamine formaldehyde, epoxy, unsaturated polyester, or organic silicon.

5. The real-time temperature-pressure detection and rapid processing system for the calibration platform according to claim 1, wherein the heat conducting material comprises heat conducting graphene, heat conducting silicone grease, heat conducting resin, or heat conducting gel.

6. The real-time temperature-pressure detection and rapid processing system for the calibration platform according to claim 1, wherein the simulation chamber is further provided therein with a pressure sensor and a temperature sensor; and the pressure sensor and the temperature sensor are connected with the control unit.

7. The real-time temperature-pressure detection and rapid processing system for the calibration platform according to claim 1, wherein the inner return pipe and the inner water supply pipe each are provided with a one-way valve.

8. The real-time temperature-pressure detection and rapid processing system for the calibration platform according to claim 1, wherein the transmission mechanism comprises a first transmission shaft, a second transmission shaft, and a drive motor; the drive motor is connected with the control unit; the drive motor comprises a first output end connected with the first transmission shaft and a second output end connected with the second transmission shaft; the first transmission shaft is provided with a first pressure sensor, and the second transmission shaft is provided with a second pressure sensor; the first pressure sensor and the second pressure sensor are connected with the control unit; and the first transmission shaft is connected with a rotating shaft of the outlet fan, and the second transmission shaft is connected with a rotating shaft of the inlet fan.

* * * * *